United States Patent [19]

Urakami et al.

[11] Patent Number: 5,168,164
[45] Date of Patent: Dec. 1, 1992

[54] OPTICAL WAVEFORM MEASURING DEVICE

[75] Inventors: Tsuneyuki Urakami; Motohiro Suyama, Hamamatsu, Japan

[73] Assignee: Hamamatsu Photonics K.K., Hamamatsu, Japan

[21] Appl. No.: 858,861

[22] Filed: Mar. 27, 1992

[30] Foreign Application Priority Data

Mar. 27, 1991 [JP] Japan .................... 3-63433

[51] Int. Cl.⁵ .............................. H01J 31/50
[52] U.S. Cl. .................... 250/458.1; 250/372; 250/214 VT; 324/77 K
[58] Field of Search ............ 250/458.1, 372, 213 VT; 324/77 K

[56] References Cited

U.S. PATENT DOCUMENTS

| | | | |
|---|---|---|---|
| 4,661,694 | 4/1987 | Corcoran | 250/213 VT |
| 4,942,293 | 7/1990 | Koishi et al. | 250/213 VT |
| 4,958,231 | 9/1990 | Tsuchiya | 250/213 VT |
| 4,980,632 | 12/1990 | Aoshima et al. | 324/77 K |
| 4,988,859 | 1/1991 | Tsuchima et al. | 250/213 VT |
| 4,994,663 | 2/1991 | Aoshima et al. | 324/77 K |
| 5,025,142 | 6/1991 | Aoshima et al. | 250/201.9 |
| 5,043,584 | 8/1991 | Koishi | 250/458.1 |
| 5,071,249 | 12/1991 | Takahashi et al. | 250/458.1 |

Primary Examiner—Carolyn E. Fields
Assistant Examiner—Drew A. Dunn
Attorney, Agent, or Firm—Cushman, Darby & Cushman

[57] ABSTRACT

When sampling light and light to be measured each having a wavelength longer than an upper wavelength limit of the sensitivity of a photocathode are incident on the photocathode of a multiphoton absorption-type electron tube, light-light sampling is enabled by two-photon absorption and one-photoelectron emission. A delaying unit adjusts an incident timing of the sampling light from an optical pulse generating unit on the elctron tube in synchronism with an incident timing of the light to be measured on the electron tube. A half mirror causes the sampling light and the light to be measured to coincide on the photocathode of the electron tube. A controlling unit controls the delaying unit to sequentially shift the incident timing of the sampling light on the electron tube. Thus, the operation of a display unit can be controlled in synchronism with the incident timing of the sampling light so that a series of sampling outputs from the electron tube can be converted to the optical waveform of the light to be measured and displayed on the display unit.

27 Claims, 3 Drawing Sheets

OPTICAL WAVEFORM MEASURING DEVICE

BACKGROUND OF THE INVENTION

1. Field of the Invention

The present invention relates to a device for measuring an optical waveform of, e.g., a high-speed optical pulse by using a light sampling method.

2. Related Background Art

According to the prior arts of an optical waveform measuring device, there are (a) a measuring device as a combination of a photodetector, e.g., a photodiode or a photomultiplier tube (to be referred to as a PMT hereinafter) and an oscilloscope, (b) a measuring device using a streak camera, and (c) a measuring device using light-light sampling by generation of a sum frequency.

However, in (a) the measuring device as a combination of the photodetector and the oscilloscope, a high time-resolution cannot be obtained (the time resolution is as low as several 10 pS), and a waveform distortion occurs. In (b) the measuring device using the streak camera, the measuring device becomes expensive. In (c) the measuring device using light-light sampling, a nonlinear optical crystal is necessary for generation of the sum frequency. However, this crystal is difficult to handle because it is deliquescent. Furthermore, phase matching must be performed when light is to be incident on this crystal, and the crystal itself is expensive.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

SUMMARY OF THE INVENTION

It is, therefore, an object of the present invention to provide a high-resolution, simple optical waveform measuring device which does not need a nonlinear optical crystal that has problems in handling.

It is another object of the present invention to provide an optical waveform measuring device comprising photoelectric converting means including a part having a function of generating one photoelectron upon absorption of one photon within a predetermined wavelength range, and a pulse light source for generating a sampling optical pulse having a predetermined wavelength outside the predetermined wavelength range.

In this measuring device, the photoelectric converting means outputs a signal corresponding to generation of one photoelectron upon multiphoton absorption within the part when light to be measured and the sampling optical pulse are simultaneously incident on the same position of the part. The number of photoelectrons generated by the part (or the output signal from the photoelectric converting means) corresponds to the product of the intensities of the light to be measured and the sampling optical pulse. For example, when an electron tube is used as the photoelectric converting means, the number of the photoelectron emitted from the photocathode of the electron tube does not only correspond to the intensity of the sampling optical pulse but corresponds to the product of the intensities of the light to be measured and the sampling optical pulse. Hence, light-light sampling without using a nonlinear optical crystal and so on can be performed by observing the output signal from the photoelectric converting means. As a result, a high time-resolution, simple, easy-to-handle optical waveform measuring device can be provided.

DETAILED DESCRIPTION OF THE PREFERRED EMBODIMENT

Figure 1:
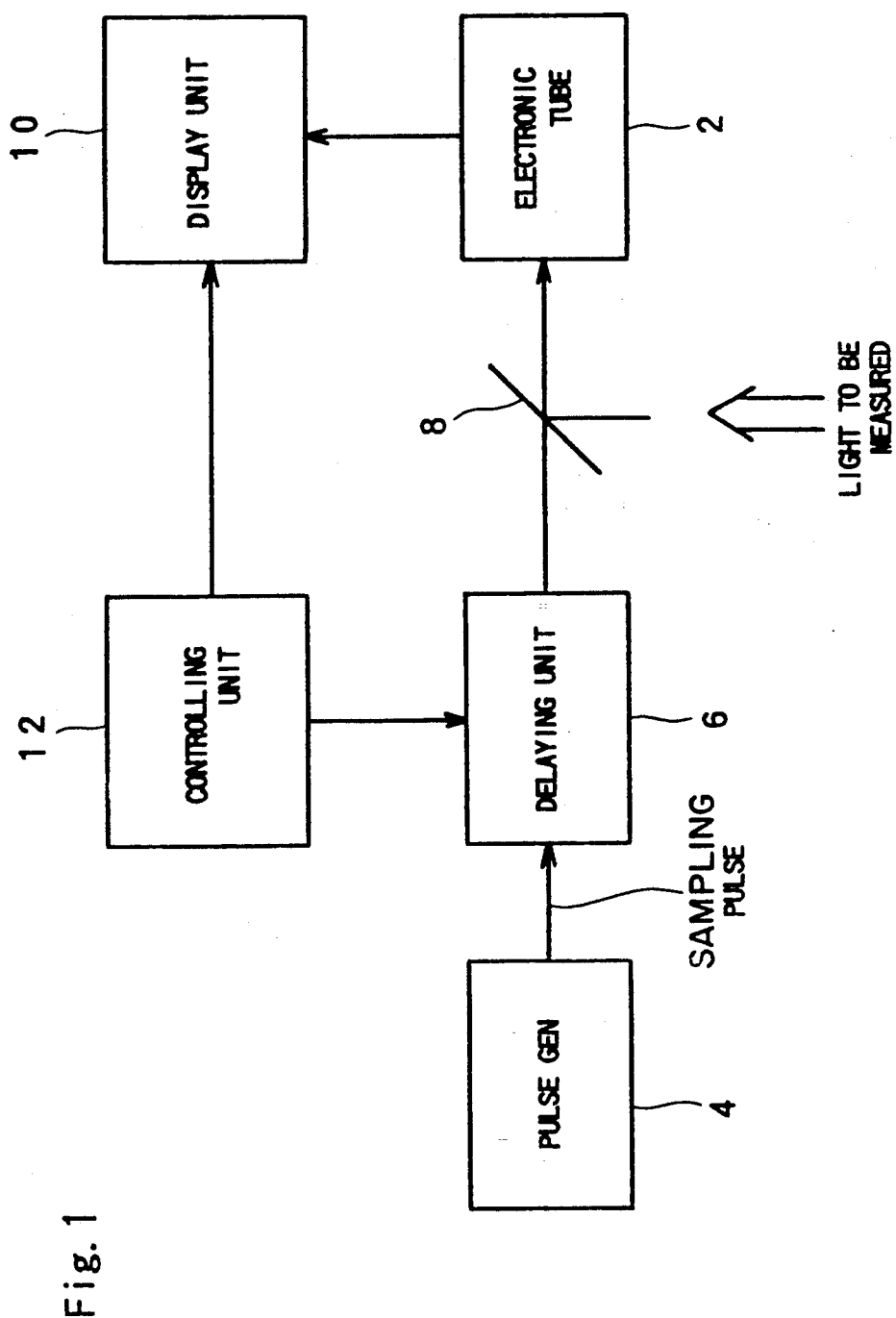
FIG. 1 is a block diagram showing the conceptual arrangement of the present invention.

The basic concept of an optical waveform measuring device according to the present invention will be briefly explained prior to the explanation on its practical embodiments. A measuring device shown in FIG. 1 can use various types of devices, e.g., an electron tube or a photoconductive device as a photoelectric converting unit for light-light sampling. For the sake of simplicity, a measuring device which uses an electron tube as the photoelectric converting unit will be described below. The photocathode of a multiphoton-absorption (or nonlinear) electron tube 2 emits one photoelectron upon absorption of one photon having a wavelength within a predetermined wavelength band (an ordinary sensitivity range of the photocathode). Outside this wavelength band, the photocathode of the electron tube 2 does not substantially have the sensitivity to emit one photoelectron upon absorption of one photon. If the wavelength of the incident light is longer than the upper wavelength limit of the sensitivity of the photocathode of the electron tube 2, one photoelectron is emitted upon incidence of two or more photons. Light-light sampling is enabled by this multi-photon absorption and one-photoelectron emission, which will be described below. An optical pulse generating unit 4 generates a sampling optical pulse having a longer wavelength than the upper wavelength limit of the sensitivity of the photocathode. A delaying unit 6 changes the incident timing of the sampling optical pulse on the electron tube 2 in synchronism with the incident timing of light to be measured on the electron tube 2. A half mirror 8 guides the sampling optical pulse passing through the delaying unit 6 and the external light to be measured to the photocathode of the electron tube 2 such that they overlap each other on the photocathode. An output signal (sampling output) from the electron tube 2 corresponds to the incident intensity of the measured light at the incident timing of the sampling optical pulse. The sampling output from the electron tube 2 is input to a display unit 10, e.g., an oscilloscope. A controlling unit 12 controls the delaying unit 6 to sequentially and gradually shift the incident timing of the sampling optical pulse on the electron tube 2 and controls the operation of the display unit 10 in synchronism with the sampling optical pulse. Thus, a series of sampling outputs from the electron tube 2 can be converted to an optical waveform of the light to be measured and displayed on the display unit 10.

The operation of the measuring device shown in FIG. 1 will be described. While the pulse of light to be measured having an arbitrary wavelength is incident on the photocathode of the electron tube 2, when a relatively short sampling optical pulse is incident on the same position of the photocathode at a controlled incident timing, one photoelectron is emitted upon incidence of, e.g., two photons of the light to be measured and the sampling optical pulse. An electric signal corresponding to this photoelectron is output from the electron tube 2 as a sampling output. In this case, a sampling output (nonlinear output) proportional to the square of the sum of the incident intensity of the light to be measured and the incident intensity of the sampling optical pulse can be obtained by arbitrarily selecting the material of the photocathode of the electron tube 2. Hence, the incident intensity of the light to be measured, when the light to be measured and the sampling optical pulse overlap, can be detected by arbitrarily processing this sampling output. That is, even in the method of using the photocathode as described above, an effect similar to that of light-light sampling using a method of generating second harmonics by using a nonlinear optical crystal can be obtained. The controlling unit 12 causes repetition of this light-light sampling by arbitrarily shifting the incident timing of the sampling optical pulse by the delaying unit 6. The profile of the optical waveform of the light to be measured can be obtained by enveloping or plotting the results of light-light sampling of the optical waveform of the light to be measured at different timings, and this profile can be displayed on the display unit 10. Since this method is based on the mutual relationship between the intensity of the sampling optical pulse and the intensity of the pulse of the light to be measured, the output from the electron tube need by integrated over a sufficiently long period of time when compared to the time width of the pulse of the light to be measured. In other words, the corresponding band of the electron tube need not be wide.

As the material of the photocathode of the electron tube 2, e.g., Au or CsI can be used. If the photocathode is made of CsI, when each of the sampling optical pulse and the light to be measured has a wavelength of about 600 nm, a sampling output proportional to the square of the sum of the incident intensity of the sampling optical pulse and the incident intensity of the light to be measured can be obtained. If the photocathode is made of Au, when the sampling optical pulse and the light to be measured are ultraviolet rays, a sampling output (nonlinear output) proportional to the square of the sum of the incident intensity of the sampling optical pulse and the incident intensity of the light to be measured can be obtained. Thus, a signal proportional to the intensity of the light to be measured at the incident timing of the sampling optical pulse can be obtained by removing the background component (the sum of the time integral of the square of the incident intensity of the sampling optical pulse and the time integral of the square of the incident intensity of the light to be measured) from the sampling output. When this light-light sampling is repeated, intensity detection of the light to be measured at different timings is enabled. Thus, the profile of the optical waveform of the light to be measured can be obtained by enveloping or plotting the detected intensities of the light to be measured.

When a photocathode capable of obtaining a sampling output proportional to the cube of the sum of the incident intensity of the sampling optical pulse and the incident intensity of the light to be measured is used, the background component is removed from the sampling output. Then, a signal corresponding to the intensity of the light to be measured at the incident timing of the sampling optical pulse, or a signal proportional to the square of this intensity can be obtained, in accordance with a ratio of the intensity of the sampling optical pulse to that of the light to be measured. When this light-light sampling is repeated, the optical waveform of the light to be measured can be measured in the same manner as described above.

A phototube, a PMT, or the like can be used as the electron tube 2. When a PMT is used, measurement with a high S/N ratio is enabled.

Various types of semiconductor devices, e.g., a photoconductive device which generates a nonlinear output upon absorption of two photons can be used in place of the electron tube. The two-photon process of a semiconductor device will be briefly described.

When a photosensitive region of a semiconductor device is simultaneously irradiated with two photons having different wavelengths which are longer than that corresponding to its band gap, the valence band is excited by either one of the photons to emit one electron. The one electron is raised to a certain level of the forbidden band and then raised to the conduction band by the other photon through the temporary intermediate state. That is, two photons are absorbed by one valence electron to generate one free electron. This indicates that two-photon absorption is caused when pulsed optical beams each having a wavelength not reaching an ordinarily utilized detection spectrum range are caused to be incident on the photosensitive region of the semiconductor device.

When light to be measured and a sampling optical pulse are caused to be incident on the semiconductor device, the number of free electrons generated by the above phenomenon corresponds to the product of the intensities of the light to be measured and the sampling optical pulse. Hence, light-light sampling without using a nonlinear optical element is enabled by observing the output from the semiconductor device. A GaAsP photodiode, a CdS photocell, an Si photodiode, or the like can be used as such a semiconductor device.

Any laser, e.g., a solid-state laser, a dye laser, a gas laser, or a semiconductor laser can be used as the optical pulse generating unit 4 as far as it generates short pulse light.

The incident timings of the sampling optical pulse and the light to be measured may be controlled by changing the incident timing of the light to be measured on the photocathode but not changing the incident timing of the sampling optical pulse on the photocathode.

When an optical amplifier for amplifying the light to be measured is connected to the input of the electron tube 2 to cause the amplified high-intensity light to be incident on the electron tube 2, measurement with a higher S/N ratio can be performed.

When a combination of an appropriate chopper and a lock-in amplifier is used, measurement with a high S/N ratio can be performed.

The practical embodiments of the optical waveform measuring device will be described.

Figure 2:
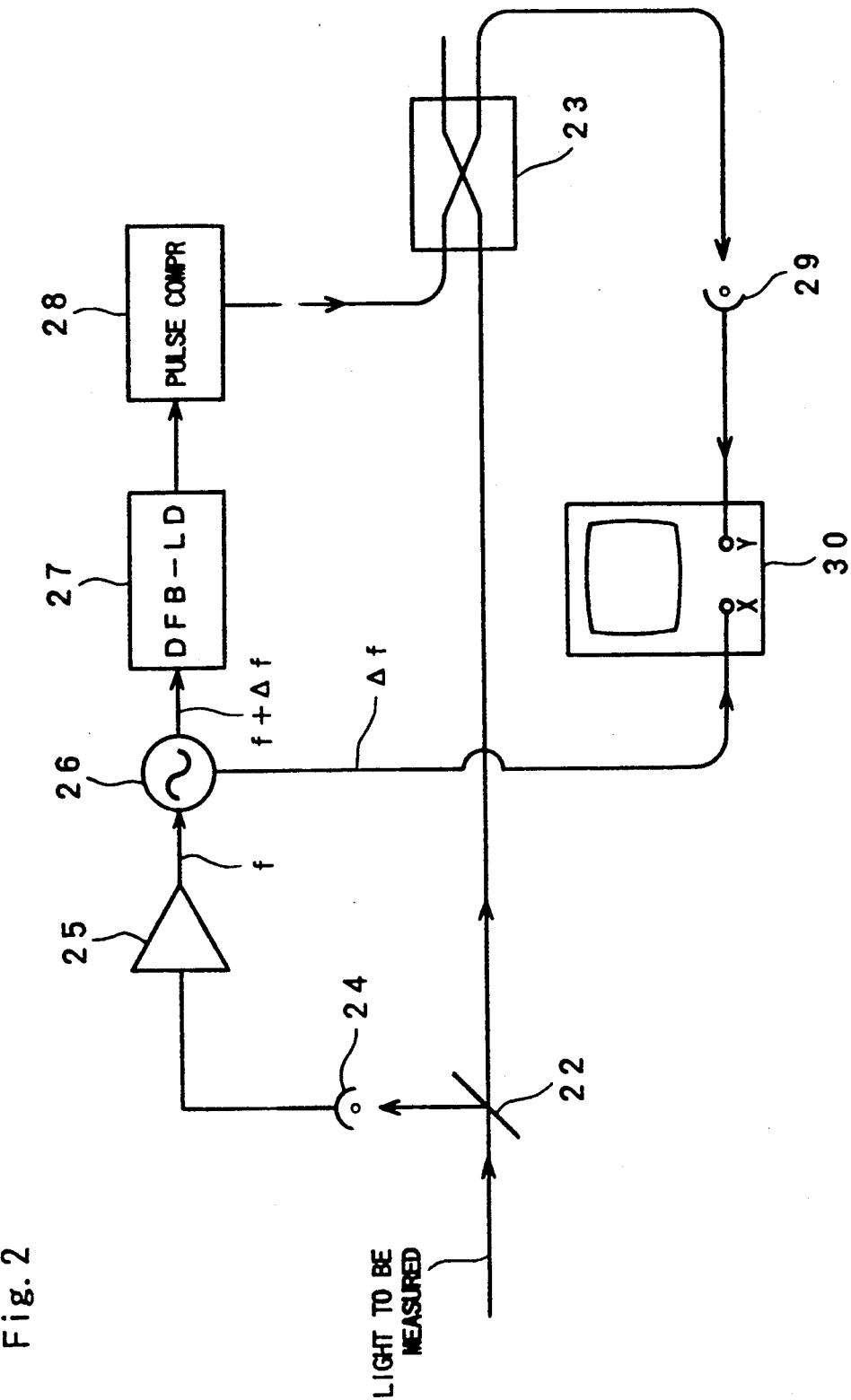
FIG. 2 is a schematic diagram of an optical waveform measuring device according to the first embodiment of the present invention.

FIG. 2 is a schematic diagram of the arrangement of the measuring device according to the first embodiment of the present invention. Part of light to be measured which is incident on a half mirror 22 is transmitted through this mirror 22 and guided to one input terminal of a single-mode fiber coupler (to be referred as an SMF coupler hereinafter) 23. The rest of the light to be measured is reflected by the half mirror 22 and is incident on a PMT 24. The PMT 24 has an ordinary sensitivity of one-photon absorption and one-photoelectron emission with respect to light to be measured. Thus, the light to be measured is linearly converted to an electrical signal by the PMT 24 and amplified by an amplifier 25. The electrical signal is frequency-modulated by f by a frequency modulating unit 26. That is, an electrical signal having a repetition frequency $f+\Delta f$, where $\Delta f$ is the repetition frequency of the light to be measured, is generated. A distributed feedback (DFB) laser diode 27 is excited by this electrical signal to generate a monochromatic light pulse having a repetition frequency $f+\Delta f$ by its gain switching. The pulse width of the monochromatic light pulse is compressed by a pulse compressor 28 comprising, e.g., a fiber, thus obtaining a sampling optical pulse having a very short pulse width compared to the pulse width of the light to be measured. This sampling optical pulse is multiplexed with the light to be measured by the SMF coupler 23 and is incident on a nonlinear PMT 29. When light to be measured and a sampling optical pulse each having a wavelength outside the range of the ordinary sensitivity of the photocathode of the nonlinear PMT 29 are incident on the photocathode of the nonlinear PMT 29, a sampling output proportional to the square of the sum of their incident intensities can be obtained. The sampling output is input to an oscilloscope 30, and the electrical signal having the repetition frequency $\Delta f$ is also input to the oscilloscope 30 from the frequency modulating unit 26. Hence, the optical waveform of the light to be measured can be displayed on the oscilloscope 30 by repeatedly sweeping the AC component of the sampling output at the repetition frequency $\Delta f$.

Figure 3:
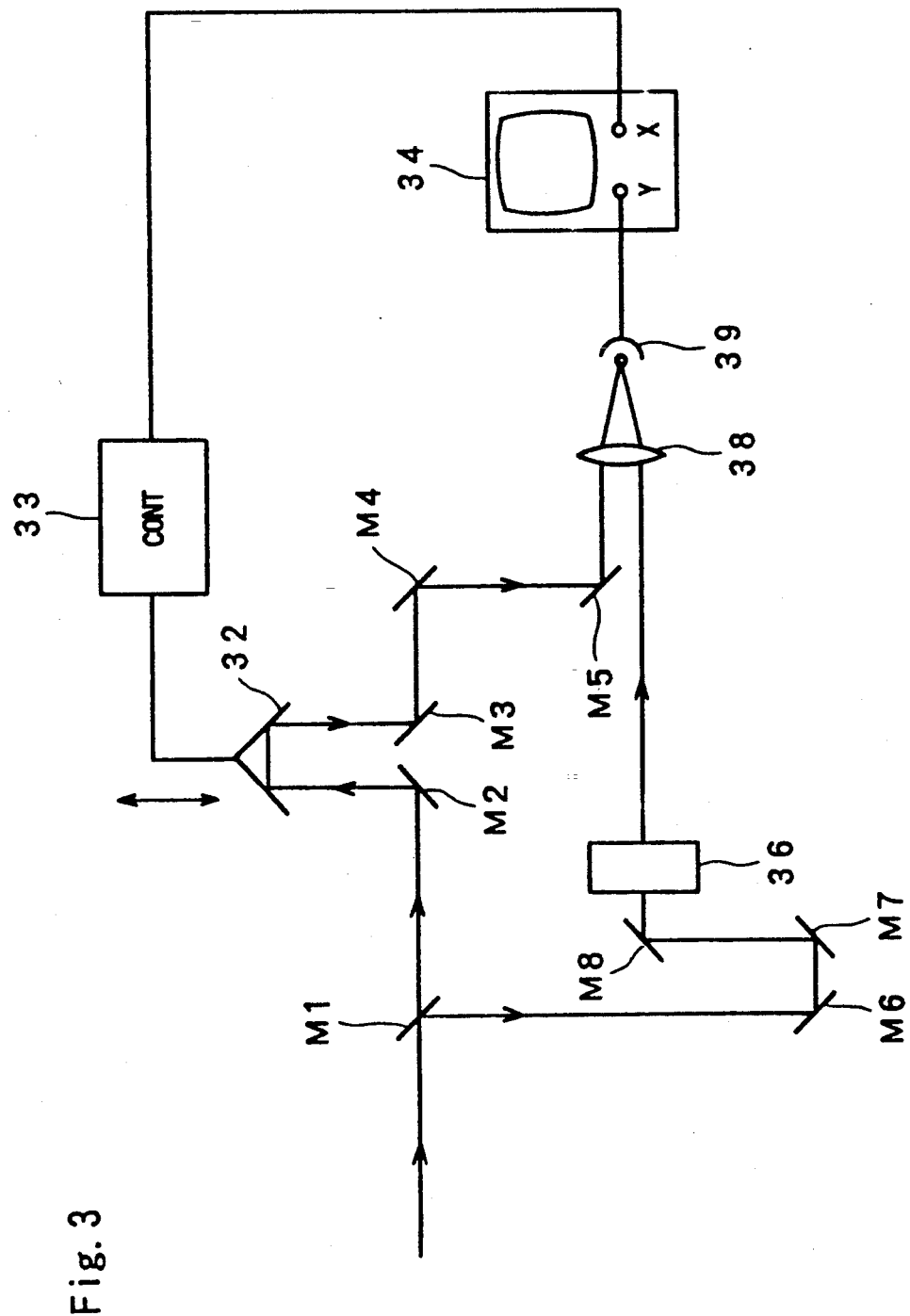
FIG. 3 is a schematic diagram of an optical waveform measuring device according to the second embodiment of the present invention.

FIG. 3 schematically shows the arrangement of a measuring device according to the second embodiment of the present invention. Short pulse light from, e.g., a CPM ring laser, a YAG laser, or a YAG-pumping dye laser is incident on a half mirror M1. Part of the short pulse light incident on the half mirror M1 is reflected by this mirror M1, reflected by mirrors M6, M7, and M8 again, and is incident on a sample cell 36 as the pumping light. The pumping light incident on the sample cell 36 excites the material to be measured inside the sample cell 36 to generate fluorescence. The fluorescence emerging from the sample cell 36 is incident on a condenser lens 38. The rest of the short pulse light is transmitted through the half mirror M1 to linearly propagate as the sampling optical pulse and is incident on a mirror M2. The sampling optical pulse reflected by the mirror M2 reciprocates between the mirrors M2, M3 and a movable prism 32 to be delayed by an arbitrarily period of time and is then incident on the condenser lens 38 through mirrors M3, M4, and M5. A controller 33 displaces the movable prism 32 to control the delay time of the sampling optical pulse. The controller 33 also supplies a scanning signal corresponding to the delay time of the sampling optical pulse to an X-axis input terminal of an oscilloscope 34. The sampling optical pulse and the fluorescence incident on the condenser lens 38 are incident on a nonlinear PMT 39. If the wavelength of each of the sampling optical pulse and the fluorescence is longer than the upper limit of the sensitivity range of the photocathode of the nonlinear PMT 39, a sampling output proportional to the square of the sum of their incident intensities can be obtained. This sampling output is input to a Y-axis input terminal of the oscilloscope 34. As a result, the optical waveform of the fluorescence generated by the material to be measured is displayed on the oscilloscope 34. Thus, measurement of fluorescence lifetime and so on of the material is enabled.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

We claim:

1. An optical waveform measuring device comprising:
   photoelectric converting means including a part having function of generating one photoelectron upon absorption of one photon within a predetermined wavelength range; and
   a pulse light source for generating a sampling optical pulse having a predetermined wavelength outside said predetermined wavelength range, wherein
   said photoelectric converting means outputs a signal corresponding to generation of one photoelectron upon multiphoton absorption within said part when light to be measured and the sampling optical pulse are simultaneously incident on said part.

2. A device according to claim 1, wherein the light to be measured has a predetermined wavelength outside said predetermined wavelength range.

3. A device according to claim 2, wherein said photoelectric converting means comprises an electron tube having a photocathode as said part.

4. A device according to claim 3, wherein said electron tube is a photomultiplier tube.

5. A device according to claim 4, wherein said photocathode is made of Au.

6. A device according to claim 5, wherein each of the sampling optical pulse and the light to be measured has a wavelength of about 600 nm.

7. A device according to claim 4, wherein said photocathode is made of CsI.

8. A device according to claim 7, wherein each of the sampling optical pulse and the light to be measured is an ultraviolet ray.

9. A device according to claim 2, wherein said photoelectric converting means comprises a semiconductor device having a photosensitive region as said part.

10. A device according to claim 9, wherein said semiconductor device is a photoconductive device.

11. A device according to claim 9, wherein said semiconductor device is a photodiode.

12. A device according to claim 1, further comprising optical means for guiding the light to be measured and the sampling optical pulse so as to overlap each other within said part.

13. A device according to claim 12, wherein said optical means includes a fiber coupler.

14. A device according to claim 12, wherein said optical means includes a lens.

15. A device according to claim 1, further comprising delaying means for changing an incident timing of the light to be measured on said part in correspondence with an incident timing of the sampling optical pulse on said part.

16. A device according to claim 1, further comprising delaying means for changing an incident timing of the sampling optical pulse on said part in correspondence with an incident timing of the light to be measured on said part.

17. A device according to claim 16, wherein said delaying means is a frequency modulator for converting a repetition frequency of the light to be measured to a higher frequency.

18. A device according to claim 16, wherein said delaying means is a movable mirror for increasing and decreasing an optical path of the sampling optical pulse.

19. A device according to claim 1, wherein said pulse light source is a semiconductor laser.

20. A device according to claim 1, wherein said pulse light source is a dye laser.

21. A device according to claim 1, wherein said pulse light source is a solid-state laser.

22. A device according to claim 1, wherein said pulse light source is a gas laser.

23. A device according to claim 16, wherein said delaying means is a frequency modulator for converting a repetition frequency of the light to be measured to a higher frequency, and said pulse light source is a semiconductor laser for generating the sampling optical pulse in response to a signal from said delaying means.

24. A device according to claim 1, further comprising display means for analytically displaying the signal from said photoelectric converting means.

25. A device according to claim 1, further comprising means for chopping the light to be measured or the sampling optical pulse and a lock-in amplifier for lock-in detecting the signal from said photoelectric converting means.

26. A device according to claim 1, further comprising an optical amplifier, for amplifying the light to be measured, connected to an input side of said photoelectric converting means.

27. A device according to claim 15, further comprising controlling means for controlling said delaying unit to gradually shift the incident timing of the sampling optical pulse, and display means for enveloping the signals from said photoelectric converting means at each incident timing of the sampling optical pulse and for displaying the enveloped signals corresponding to the waveform of the light to be measured.

* * * * *